Dec. 9, 1947.  J. P. WHANN  2,432,186
SHUTTER CONTROL
Filed Dec. 17, 1942  3 Sheets-Sheet 1
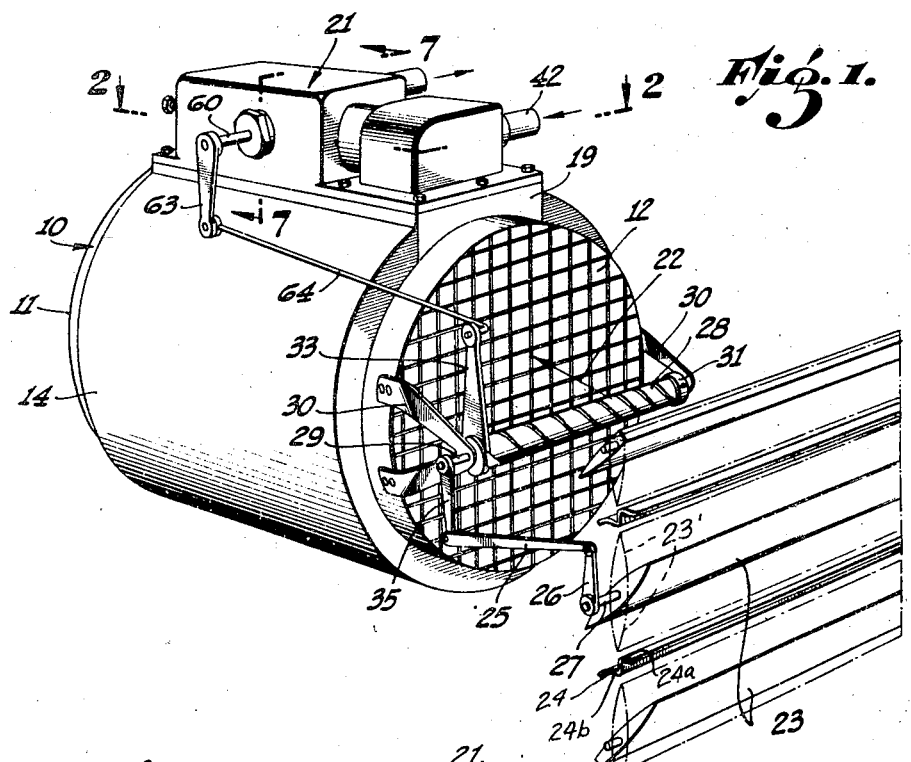
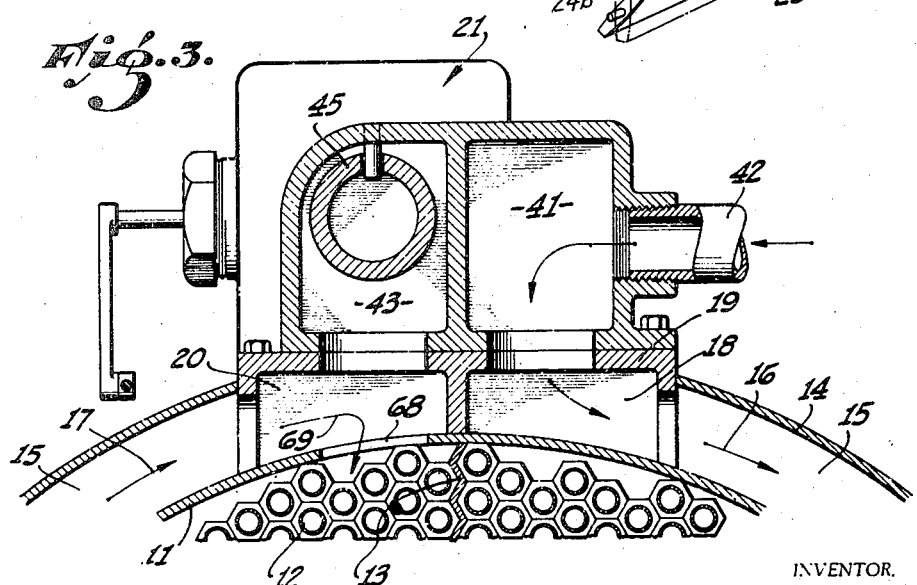
INVENTOR.
JESSE P. WHANN
BY
ATTORNEY.

Dec. 9, 1947.  J. P. WHANN  2,432,186
SHUTTER CONTROL
Filed Dec. 17, 1942  3 Sheets-Sheet 2
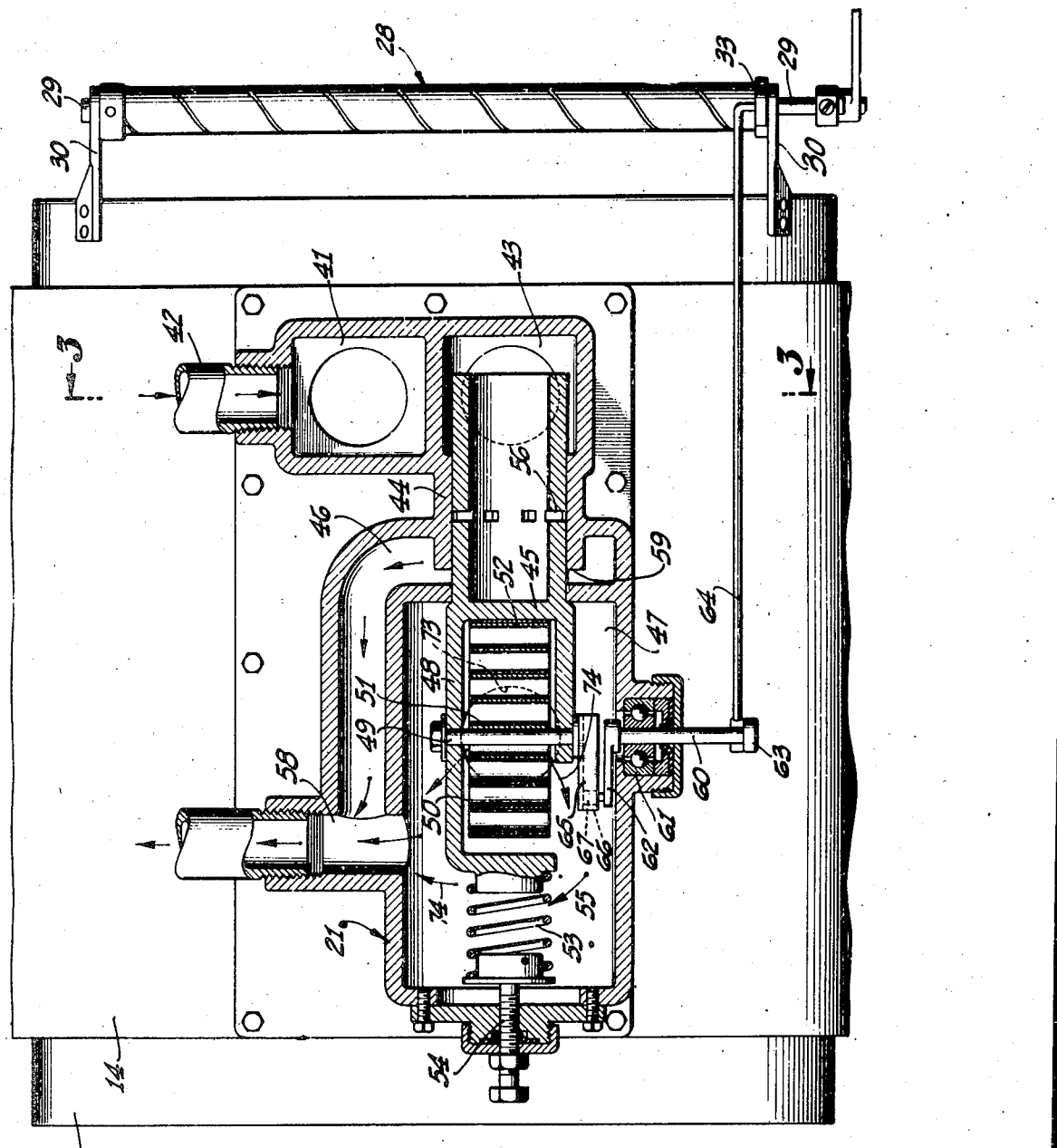
Fig. 2.
INVENTOR.
JESSE P. WHANN
BY
ATTORNEY.

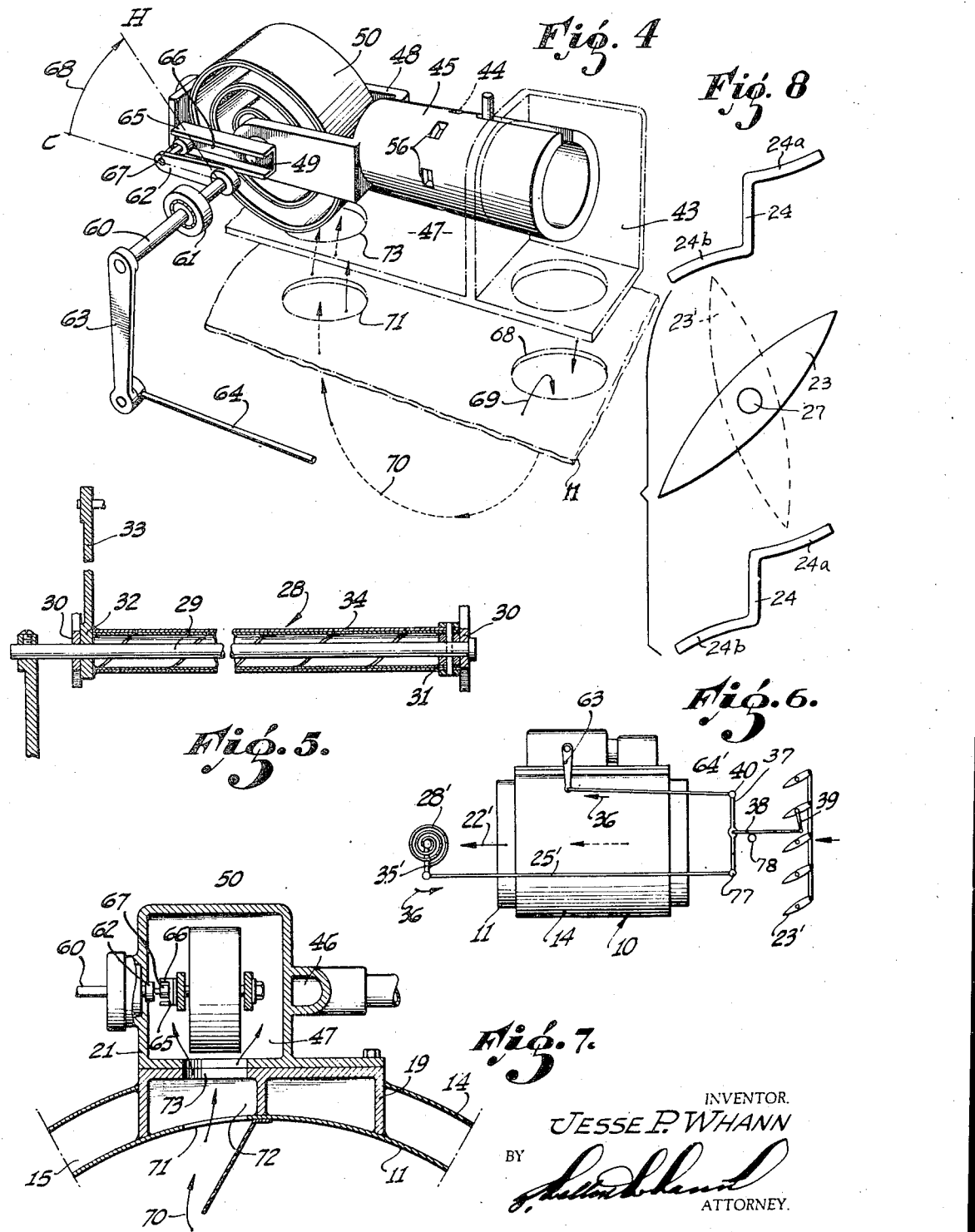

Patented Dec. 9, 1947

2,432,186

UNITED STATES PATENT OFFICE 2,432,186

SHUTTER CONTROL

Jesse P. Whann, Los Angeles, Calif., assignor to The Garrett Corporation, Airesearch Manufacturing Company division, Inglewood, Calif., a corporation Application December 17, 1942, Serial No. 469,278

11 Claims. (Cl. 236—35)

My invention relates to cooling systems of the type employed for cooling the lubricating oil of internal combustion engines, and relates in particular to a control means especially adapted for use with coolers associated with aircraft engines.

It is an object of the invention to provide an oil cooler having a control which controls the flow of air through the air spaces of the cooler, this control acting with direct reference to the temperature of the oil which has been subjected to cooling action, the temperature of the air which is to pass through the cooler, and the pressure of oil resulting in the cooler from thickening or congealment of the oil therein.

The invention has valve means, which may be in the form of shutters for controlling the flow of air through the air passages of the cooler and a thermostat exposed to the temperature of the oil which has been cooled, this thermostat accomplishing opening and closing of the shutters to modulate the air flow in accordance with changes in temperature of the oil which has been subjected to cooling action, for the purpose of maintaining the cooled oil at a temperature within a prescribed range. This thermostat is preferably placed in an outlet passage or chamber into which the oil flows from the cooling spaces of the oil cooler. It is found that there is a time lag between an action of the thermostat to accomplish a change in the position of the shutters and the effected change in the temperature of the oil in response to the action of the thermostat. This natural condition tends to produce an effect referred to as hunting. Also, an aircraft in flight will pass through zones of different temperatures so that at one time the air which passes through the cooler is at a comparatively high temperature, and shortly thereafter may drop to a relatively low temperature, this resulting in an abrupt increase in the heat absorbing capacity of the cooler as compared to the rate of flow of the oil and the heat to be extracted therefrom to bring the oil to the required temperature. This flow of cold air reduces the temperature of the metal walls of the tubes forming the air passages and an excess amount of heat is absorbed from the oil stream passing through the oil spaces of the cooler so as to reduce its temperature below the predetermined range. The oil, at reduced temperature, transmits to the thermostat a resultant of the drop in the temperature of the air passing through the air spaces of the cooler, and cooling of the responsive parts of the thermostat results in effectuation of a closing movement of the shutters, but there is a lag of time or delay between the time at which the change in the air temperature occurs and the time at which the shutters are moved toward closed position for the purpose of compensating for the air change. Sometimes the result of this delay in the actuation of the shutters results in loss of control of the cooler through congealing of oil on the surfaces of the air tubes, which congealed oil acts as an insulation, or complete congealing of the oil within the cooler so as to substantially prevent flow of oil therethrough.

My present invention provides means responsive to changes in temperature of the air moving toward the cooler to reduce the rate of flow or quantity of the air passing through the cooler. Although I may employ two sets of shutters to control the flow of air through the cooler, one of which is operated in accordance with the changes in the temperature of the air, I prefer to employ a single shutter unit, with means to operate the shutter unit in response to changes in both oil and air temperatures, for the purpose of maintaining a control over the air flow which will avoid congealment of the oil within the cooler.

It is a further object of the invention to provide a control for the flow of the cooling medium through an oil cooler having a part responsive to changes in temperature and/or viscosity of the oil, means for controlling the flow of the cooling medium in accordance with changes of temperature and/or viscosity, and a second thermostat exposed to the temperature of the cooling medium and operating to actuate the means for controlling the flow of cooling medium so as to reduce the flow of cooling medium in relation to its drop in temperature, whereby the heat absorbing effect of the cooling medium at any time passing through the cooler will be held reasonably constant, or so that wide fluctuations of the heat absorbing effect of the cooling medium will be avoided.

A further object of the invention is to provide a cooler control having a part movable in response to pressure changes in the inlet portion of the cooler, and having therewith a valve which is moved into open position when a predetermined pressure is reached, this valve allowing the oil to escape and to thereby prevent build-up of pressure in the cooler beyond the said predetermined value.

Further objects and advantages of the invention will be brought out in the following part of the specification.

Referring to the drawings which are for illustrative purposes only,

Fig. 1 is a fragmentary perspective view showing a form of my invention.

Fig. 2 is an enlarged cross-sectional view taken as indicated by the line 2—2 of Fig. 1.

Fig. 3 is a cross-section taken as indicated by the line 3—3 of Fig. 2.

Fig. 4 is a fragmentary perspective view showing the cooperative relation of control parts.

Fig. 5 is a fragmentary sectional view of the external thermostat shown in Figs. 1 and 2.

Fig. 6 is a diagrammatic view showing a form of the invention having means responsive to changes in both temperature and rate of flow of the air stream.

Fig. 7 is a fragmentary section on a plane indicated by the line 7—7 of Fig. 1, to show the connection of the outlet chamber to the cooler.

Fig. 8 is an enlarged end view of one of the shutters and associated grille bars or hood parts.

In Fig. 1 I show an oil cooler 10 of the form commonly employed in oil coolers. It has a cylindric shell 11, open at both ends, with longitudinally extending tubes 12 therein to define air passages. The oil cooling space within the shell surrounds the tubes 12; therefore, the oil to be cooled which is passed through the cooler is brought into heat transfer relation to the flow of air through the tubes, the oil and the air being separated by the walls of the tubes which are relatively thin and of a metal having high heat conductivity so that an efficient transfer of heat from the oil stream to the air stream occurs. It is common practice to provide baffle plates within the cooler shell 12 to direct the flow of oil therein. In view of the well known use of baffle plates, I have merely indicated their use schematically at 13 in Fig. 3. Also, in keeping with common practice, an outer cylindric wall 14 is disposed around the shell 11 so as to form an external warm up passage 15 through which the oil passes circumferentially in contact with the outer face of the shell 11 as indicated by arrows 16 and 17, from the inlet chamber 18 of a fitting 19 which is positioned on top of the shell 11, to the outlet chamber 20 of the fitting 19. A control unit 21 is secured to the fitting 19 as shown.

Valve means for controlling the flow of air through the tubes 12 of the cooler 10, as indicated by arrows 22, is shown in the form of shutters 23 interlinked for simultaneous opening and closing movement by interconnected levers now well known in the art of oil coolers, and therefore not herein shown. The invention provides means for opening and closing the shutters 23 in accordance with the temperature of the air which is to pass through or which passes through the air spaces of the cooler 10. This responsive means controls the movement of linkage 25 connected to a lever 26 mounted on a shaft 27 of the shutter mechanism. This linkage 25 is controlled by a thermostat 28 disposed in the path of flow of air, which path of flow has the cooler tubes 12 and the shutters 23 therein. In the narrow spaces between the edges of the shutters 23 when they are in vertical position as indicated by phantom lines 23', there are narrow strips 24 having along their upper and lower edges arcuate flanges 24a and 24b, the upper flanges 24a projecting outward or away from the cooler 10 and the lower flanges 24b projecting inward or toward the cooler 10. When the shutters 23 are rotated clockwise from the position 23' thereof toward the full line positions thereof, they will gradually open so as to permit a gradually increasing flow of air toward and through the cooler; but, the upper and lower lips 24a and 24b of the bars 24 act as guards for preventing a flow of air when the control rotates the shutters 23 in counterclockwise direction from the vertical positions in which they are shown at 23'. Therefore, counterclockwise rotation of the shutters 23 from closed position will not result in opening of the shutters.

As shown in Figs. 1, 2, and 5, this thermostat 28 comprises a shaft 29 supported for rotation by brackets 30. A collar 31 is fixed on the far end of the shaft 29 and a collar 32 is supported rotatively on the near end of the shaft 29, this collar 32 having a lever 33 projecting upward therefrom. A torsionally acting helix 34 of bimetallic thermostat stock is extended between and connected to the collars 31 and 32. With the collar 32 held from rotation, a change in the temperature of the helix 34 will result in transmission of rotation through the collar 31 to the shaft 29, which is shown with a downwardly extending lever 35 on its near end. As shown in Fig. 1, the lever 35 is connected to the linkage 25. The thermostat 28 is so arranged that when the temperature of the air stream drops, the lever 35 will move in clockwise direction so as to swing the shutters 23 toward closed position, or, in other words, from the full line positions in which they are shown in Fig. 1 toward the dotted line positions thereof.

In Fig. 6 I show the thermostat 28', analogous to the thermostat 28, disposed in the air stream leaving the cooler 10 as indicated by the arrow 22'. A reduction in the temperature of the air which contacts the thermostat 28' moves the lever 35' in anticlockwise direction so that motion, as indicated by an arrow 36 in Fig. 6, is transmitted through a link 25' to a differential lever 37 which is connected through a link 38 connected in turn to a lever 39 by which shutters 23' are swung. When the link 25' is shifted rightward, as indicated by the arrow 36, the differential lever 37 will be swung in counter-clockwise direction around the pivot 40 at its upper end so as to shift the link 38 rightward and swing the shutters 23' toward closed position. Assuming that hot oil is flowing through the oil spaces of the cooler 10 at a reasonably constant rate and temperature, factors which will affect the temperature of the air leaving the cooler, as indicated by the arrow 22' of Fig. 6, are the temperature and the rate of flow of the incoming air. If the rate of flow of the air remains constant, a change in temperature of the air entering the cooler will be reflected in the change in temperature of the air leaving the cooler. If the temperature of the air passing into the cooler remains constant, changes in rate of flow of the air will likewise be reflected in change in temperature of the air leaving the cooler, as indicated by the arow 22'. For example, let it be assumed that with the air entering the cooler at a constant temperature, its rate of flow is increased. This will mean that for a given input of heat into the cooler by the oil stream there will be an increase in the volume of air passing through the cooler during a given period of time, so that each unit volume of air passing through the cooler will be warmed to a lesser extent, somewhat in proportion to the increase in volume of air passing through the cooler during the given period of time. It will be perceived, also, that changes in temperature and rate of flow of oil through the cooler will be reflected in the temperature of the out-flowing air indicated by the arrow 22'. For example, should the temperature of the oil fed into the cooler increase, the air stream will be warmed to a greater extent and the thermostat 28' will move the lever 35' in a direction opposite to that indicated by the arrow 36, which movement will be transmitted through the link 25', the differential lever 37, the link 38, and the lever 39 in a manner to move the shutters 23' toward their fully opened position.

As shown in Figs. 1, 2, and 3, the control unit 21 comprises a shell having an inlet chamber 41, through which the hot oil to be cooled passes from a delivery conduit 42 to the inlet chamber 18 of the cooler fitting 19. It has also a bypass chamber 43 which communicates with the bypass chamber 20 of the fitting 19. As shown in Fig. 2, a cylindric wall 44 extends leftward from the bypass chamber 43 and slidably supports therein a piston 45, the leftward portion of which passes across a bypass passage 46 and enters the outlet chamber 47 of the control unit 21.

The leftward end of the piston 45 carries a rigid metal frame 48 supporting a shaft 49 in transverse relation. A spiral bimetallic thermostat 50 has its inner end connected at 51 to the shaft 49 and has its outer end connected at 52 to the frame 48. An adjustable spring 53, compressed by an adjusting screw 54, bears against the leftward end 55 of the frame 48 and urges the piston 45 in rightward direction so as to normally maintain the same in its retracted position shown. The piston 45 comprises a bypass valve. It has bypass ports 56 therein which will communicate with the bypassage 46 when excess pressure differential between the bypass chamber 43 and the outlet port 58 of the unit 21 carries the piston 45 leftward against the force of the spring 53 to a position wherein the ports 56 lie in overlapping relation to the shoulder 59 at the end of the cylindric wall 44.

A shaft 60 is supported by a bearing 61 in a position to pass through the wall of the outlet chamber 47 and coaxially with the shaft 49 when the piston 45 is in retracted position, and accordingly, supports the shaft 49 in the position in which it is shown in Figs. 2 and 4. The shaft 60 has on its inner end a lever 62, and on its outer end has a downwardly projecting lever 63 connected by a link 64 with the upper end of the lever 33. The shaft 49 carries a lever 65 in a position confronting the lever 62, and sliding cooperative connection between these levers 62 and 65 is provided. One of these levers has therein a groove or track and the other carries a member to engage the groove or track. In this disclosure, the lever 65 is shown with a track consisting of a groove 66, and the lever 62 is shown with a projection or roller 67 which projects into the groove.

In Figs. 2 and 4 the levers 65 and 62 are shown in the positions which they occupy when the thermostat 50 is cold. When the oil warms up and the temperature of the thermostat 50 is raised, the lever 65 will be rotated upward or clockwise from the position in which it is shown in Fig. 4. Since the shafts 49 and 60 are coaxial at this time, a like rotary motion will be transmitted to the lever 62 through the engager 67 and the lever 63 will be swung in clockwise direction to transmit leftward movement through the link 64 to the upper end of the lever 33 which will be thereby rotated in counter-clockwise direction. This counter-clockwise rotation will be transmitted through the thermostat helix 34 to the shaft 29 and thence to the lever 35, with the result that the shutters 23 will be swung toward open position in response to an increase in temperature of the oil passing through the outlet 49 of the control unit 21. How the cooled oil reaches the outlet chamber 47 is shown in Figs. 3 and 7. With relation to Fig. 3, I have traced the flow of the hot oil from the delivery piping 42 through the warm-up space 16 to the bypass chamber 20, as indicated by the arrow 17. The shell 11 has a cooler inlet port 68 communicating with the bypass chamber 20, through which the hot oil passes as indicated by the arrow 69 of Fig. 3 and Fig. 4 into the oil cooling spaces within the shell of the cooler. Then, as indicated by phantom arrows 70 in Fig. 4, the oil passes through the oil cooling spaces of the cooler to a cooler outlet port 71 which is formed in the shell 11 as shown in Figs. 4 and 7. As further shown in Fig. 7, the oil then passes through a chamber 72 in the fitting 19 and then through a port 73 into the outlet chamber 47. This port 73, through which the oil passes into the outlet chamber 47, is indicated in Figs. 3, 4, and 7. The thermostat 50 is exposed to the change in temperature occurring in the oil which flows through the outlet chamber 47, as indicated by arrows 74 therein.

The shafts 49 and 60 lie in the horizontal plane in which the piston 45 is movable, and when the thermostat 50 is cold, the track 66 of the lever 65 will be in or substantially parallel to this horizontal plane, with the result that movement of the piston 45 and the thereby supported shaft 49 in leftward direction from the position thereof shown in Figs. 2 and 4, will not result in movement of the engager 67 located at the end of the lever 62. If the pressure in the bypass chamber 43 is sufficient to move the piston to its extreme leftward position, the shaft 49 will then substantially coincide with the axis of the engaging roller 67 so that swinging of the lever 65 will transmit substantially no movement to the lever 62. Also, since the rightward end of the track 66 lies in the horizontal plane defined by the axes of the shafts 49 and 60, movement of the piston 45 and the parts supported thereby to their extreme leftward positions will assure bringing of the engager 67 and the lever 62 into the horizontal plane defined by the shafts 49 and 60, even though the lever 65 may be in an inclined position. In other words, the track 66 of the lever 65 comprises an adjustable cam, the rearward or rightward end of which lies always on the axis of the shaft 49 and in the horizontal plane defined thereby. As this cam is moved leftward with relation to the engager 67, the cam will operate to move the engager 67 toward the said horizontal plane. As hereinbefore brought out, movement of the lever 62 into the horizontal plane swings the shutters 23 toward or into closed position. Therefore, whenever the lever 65 is swung upward from the horizontal position in which it is shown, leftward bodily movement thereof by fluid pressure in the chamber 43 against the piston 45 will result in a downward movement of the engager 67 so as to rotate the lever 62 in a direction to accomplish a closing movement of the shutters, and when congealment of oil within the cooler is sufficient to produce a pressure differential acting in the chamber 43 against the piston 45 to move the same leftward to its extreme position, the shutters will be closed and the oil from the inlet portion of the cooler will pass through the ports 56 of the piston 45 into the bypass passage 46 which communicates with the outlet port 58. It will be seen, accordingly, that the action of the thermostat 50 to move the shutters toward opened position will be modulated by the pressure differential existing between the chamber 43 and the outlet chamber 47. Likewise, the positions of the shutters 23 will be changed in accordance with changes in the temperature of the air moving through the path which includes the interiors of the cooler tubes 12. Oil coolers such as shown are designed so that they will operate to cool the heated oil from the engine when a predetermined high temperature air flow is passed through the air spaces of the cooler. For example, with respect to a given engine, the cooler may be designed to operate when the air flow has a temperature of 90°. The aircraft, however, may pass through temperature zones which have at times been known to reach the low value of 70° F. below zero. The present invention provides means to compensate for this reduction in air temperature by a reduction in the flow of air, and the thermostat which is exposed directly to the air flow is designed first by computation and then by checking through the process of trial and error in the laboratory so as to maintain in the air flow through the cooler a substantially constant heat absorbing capacity. For example, a given quantity of air flowing through the tubes of the cooler at a given velocity and at a temperature of 90° will have a heat absorbing capacity characteristic of the conditions under which it is used. As the temperature of the air drops, its heat absorbing capacity per unit of air increases; therefore, the thermostat 28 shown in Fig. 1 and the thermostat 28' shown in Fig. 6 will act to reduce the quantity of air in relation to its reduction in temperature so that the heat absorbing capacity of the air which passes through the tubes of the cooler during different units of time will be the same.

In Fig. 6 is shown a modification of the control unit 21. Its downwardly projecting lever 63 is connected by means of a link 64', analogous to the link 64, with the pivot 46 at the upper end of the differential lever 37. Clockwise rotation of the lever 63 will transmit leftward movement, as indicated by the arrow 36, through the link 64' to the pivot 46 so that the lever 37 will be rotated in counterclockwise direction around the pivot 77 at its lower end and by which it is connected to the link 25', thereby transmitting leftward movement to the link 38 which will act through the lever 39 to move the shutters 23' toward opened position. Counter-clockwise movement of the lever 63 of Fig. 6, either as the result of temperature change in the thermostat 50 or bodily movement of the lever 65 in leftward direction as a result of pressure differential between the cooler inlet and the cooler outlet, will produce closing movement of the shutters 23' in accordance with the magnitude of this pressure differential. The differential lever 37 and the link 38 may be supported by any suitable means such as, for example, a fixed bearing member 78 on which the link 38 rests for sliding movement.

A feature of the invention, as illustrated in Fig. 6, consists in the provision of a control which responds to changes in the pressure differential between the inlet and outlet of the cooler, to changes in the velocity and temperature of the air stream, and to changes in the velocity and temperature of the oil which is passed through the cooling spaces of the cooler 10.

I claim as my invention:

1. In a control for an oil cooling system for an internal combustion engine having an oil cooler having an oil inlet and an oil outlet; cooling means associated with the cooler; means for varying the cooling capacity of said cooling means; delivery piping for conducting hot oil from the engine to said oil inlet of the cooler; and return piping to carry oil away from said oil outlet to the oil inlet of the engine, the combination of: a thermostat responsive to the temperature of the circulating oil; means actuated by said thermostat for the operation of said varying means whereby heating of said thermostat will produce an increase in the cooling capacity of said cooling means and cooling of said thermostat will produce a decrease in the cooling capacity of said cooling means, said actuating means including a pivoted cam lever oscillatable about its pivot by said thermostat and a cam follower arm having a cam follower engaging said cam lever for radial movement along said cam lever, said cam follower arm being oscillatable upon an axis parallel to the pivot of said cam lever and operatively connected to said varying means; and means responsive to changes in the pressure drop between said inlet and said outlet for translatively reciprocating said lever in the plane of its rotation, whereby a pressure drop increase will decrease the cooling capacity of said cooler.

2. The combination defined in claim 1 in which said pressure drop responsive means comprises a stationary cylinder connected at its ends to said inlet and outlet and a piston cooperating with said cylinder, in which said thermostat is of the spiral type with a central live end, and is carried by said piston, in which said cam lever is pivotally mounted within said cylinder and on said piston coaxially with and operatively connected to said live end, and in which said cam follower arm is pivotally mounted on the wall of said cylinder, said varying means being in a position in which the cooling capacity of said cooling means is at a minimum when said cam follower is in the line of translative movement of the pivoted end of said lever.

3. In a control for an oil cooling system for an internal combustion engine having an oil cooler having an oil inlet and an oil outlet; cooling means associated with the cooler; means for varying the cooling capacity of said cooling means; delivery piping for conducting hot oil from the engine to said oil inlet of the cooler; and return piping to carry oil away from said oil outlet to the oil inlet of the engine, the combination of: a thermostat responsive to the temperature of the circulating oil; means actuated by said thermostat for the operation of said varying means whereby heating of said thermostat will produce an increase in the cooling capacity of said cooling means and cooling of said thermostat will produce a decrease in the cooling capacity of said cooling means, said actuating means including a first lever operatively connected to said varying means and a second lever which is oscillatable by said thermostat about an axis parallel to the pivot of said first lever, said first lever having its movable end slidably reciprocatable upon, and longitudinally of said second lever; and means responsive to changes in the pressure drop between said inlet and said outlet for translatively reciprocating said second lever in the plane of its rotation, said varying means being in a position in which the cooling capacity of said cooling means is at a minimum when said movable end of said first lever is on the line of reciprocation of the pivot of said second lever.

4. Shutter mechanism for the circulatory oil cooling system of an internal combustion engine having: an oil cooler through which the circulating stream of oil passes; heat exchange walls associated with said cooler; means for passing a stream of air contiguously to said heat exchange walls, said shutter mechanism comprising a shutter disposed transverse to said air stream for shutting off the air flow and adjustable about a transverse axis to provide a flow of air at varying rates; and a hood of arcuate transverse section concentric with said axis at each movable transverse edge of said shutter extending in one rotational direction only over a short arc from the position of said edge when said shutter is in said transverse position, whereby said shutter will inhibit air flow when it is in any position of adjustment in which a movable edge thereof is disposed adjacently under said hood.

5. Shutter mechanism for the circulatory oil cooling system of an internal combustion engine having: an oil cooler through which the circulating stream of oil passes; heat exchange walls associated with said cooler; means for passing a stream of air contiguously to said heat exchange walls, said shutter mechanism comprising a shutter disposed transverse to said air stream for shutting off the air flow and adjustable about a transverse axis to provide a flow of air at varying rates; and means for preventing airflow past said shutter when it is adjustably disposed at any angle to said transverse position within a small arcuate range of adjustment in one direction only from said transverse position.

6. In a control for an oil cooling system for an internal combustion engine having an oil cooler having an oil inlet and an oil outlet; cooling means associated with the cooler, comprising means for continuously passing a cooling fluid medium in heat exchange relation to the oil in the cooler; means for varying the cooling capacity of said cooling means; delivery piping for conducting hot oil from the engine to said oil inlet of the cooler; and return piping to carry the oil away from said oil outlet to the oil inlet of the engine, the combination of: a first thermostat responsive to the temperature of the circulating oil; a second thermostat responsive to the temperature of said cooling medium which has not come into said heat exchange relation with the oil; means controlled by the net thermal movement of both said thermostats for the operation of said varying means whereby heating of either of said thermostats will produce an increase of the cooling capacity of said cooling means and cooling of either of said thermostats will produce a decrease in the cooling capacity of said cooling means; and means overriding the action of said first thermostat and responsive to changes in the pressure drop between said inlet and outlet for decreasing the cooling capacity of said cooler at pressure drop values above a predetermined value.

7. In a control for an oil cooling system for an internal combustion engine having an oil cooler having an oil inlet and an oil outlet; cooling means associated with the cooler, comprising means for continuously passing a cooling fluid medium in heat exchange relation to the oil in the cooler; and means for varying the cooling capacity of said cooling means; delivery piping for conducting hot oil from the engine to said oil inlet of the cooler; return piping to carry oil away from said oil outlet to the oil inlet of the engine, the combination of: a first thermostat responsive to the temperature of the circulating oil; a second thermostat responsive to the temperature of said cooling medium which has not come into said heat exchange relation with the oil; means controlled continuously during the operation of the engine by the net thermal movement of both said thermostats for the operation of said varying means whereby heating of either of said thermostats will produce an increase of the cooling capacity of said cooling means and cooling of either of said thermostats will produce a decrease in the cooling capacity of said cooling means; and means overriding the action of said first thermostat and responsive to changes in the pressure drop between said inlet and outlet for fixing at a minimum value the cooling capacity of said cooler at pressure drop values above a predetermined value.

8. In a control for a circulatory oil cooling system for an internal combustion engine having an oil cooler through which the circulating stream of oil passes, heat exchange walls associated with said cooler, means for passing a stream of air contiguously to said heat exchange walls, and adjustable shutter means for said air stream, the combination of: a first thermostat responsive to the temperature of the oil leaving the cooler; a second thermostat responsive to the temperature of the air stream, means for adjusting said shutter means, said adjusting means during the operation of the engine being under the control of both of said thermostats whereby heating of either of said thermostats will produce an opening adjustment of said shutter means and a cooling of either of said thermostats will produce a closing adjustment of said shutter means; and means overriding the action of said first thermostat and responsive to changes in the pressure drop between said inlet and outlet connected to said shutter means in overriding relation to said first thermostat and in supplementary relation to said second thermostat for closing said shutter means in correlation with pressure drops of excessive value.

9. In a control for a circulatory oil cooling system for an internal combustion engine having an oil cooler through which the circulating stream of oil passes, heat exchange walls associated with said cooler, means for passing a stream of air contiguously to said heat exchange walls, and adjustable shutter means for said air stream, said adjustable shutter means having a closed position shutting off air flow through the cooler and when moved in one direction therefrom progressively increases said airflow and when moved in the other direction over a limited range shuts off air flow through the cooler, the combination of: a first thermostat responsive to the temperature of the oil leaving the cooler; a second thermostat responsive to the temperature of the air stream; and means for adjusting said shutter means, said adjusting means during the operation of the engine being under the control of both of said thermostats whereby heating of either of said thermostats will produce an opening adjustment of said shutter means and a cooling of either of said thermostats will produce a closing adjustment of said shutter means.

10. In a circulatory oil cooling system for an internal combustion engine, the combination of: an oil cooler through which the circulating stream of oil passes; heat exchange walls associated with said cooler; means for passing a stream of air contiguously to said heat exchange walls; a shutter disposed transverse to said air stream for shutting off the air flow and adjustable about a transverse axis in either rotational direction from said transverse position; means shutting off flow of air past said shutter when in said transverse position or in positions over a small arcuate range in one direction therefrom; a first thermostat responsive to the temperature of the oil; a second thermostat responsive to the temperature of the air stream in advance of its passage along said walls; means for adjusting said shutter means, said adjusting means being under the control of both of said thermostats to correlate expansion of either of said thermostats with an opening adjustment of said shutter means in the other direction and a contraction of either of said thermostats with a closing adjustment of said shutter means in the one direction; and means responsive to changes in the pressure drop between said inlet and outlet connected to move said shutter means to said transverse position in overriding relation to said first thermostat and in correlation with pressure drops of excessive valve, said second thermostat being connected to said shutter means in supplementary relation to said pressure drop responsive means.

11. In a control for an oil cooling system for an internal combustion engine having an oil cooler having an oil inlet and an oil outlet, cooling means associated with the cooler, comprising means for continuously passing a cooling fluid medium in heat exchange relation to the oil in the cooler, means for varying the cooling capacity of said cooling means, delivery piping for conducting hot oil from the engine with said oil inlet of the cooler, and return piping to carry oil away from said oil outlet with the oil inlet of the engine, the combination of: a first thermostat responsive to the temperature of the circulating oil; a second thermostat responsive to the temperature of said cooling medium; means controlled by the net thermal movement of both said thermostats for the operation of said varying means whereby heating of either of said thermostats will produce an increase of the cooling capacity of said cooling means and cooling of either of said thermostats will produce a decrease in the cooling capacity of said cooling means; and means overriding the action of said first thermostat and responsive to changes in the pressure drop between said inlet and outlet for decreasing the cooling capacity of said cooler at pressure drop values above a predetermined value.

JESSE P. WHANN.

REFERENCES CITED

The following references are of record in the file of this patent:

UNITED STATES PATENTS

| Number | Name | Date |
|---|---|---|
| 1,283,167 | Harrison | Oct. 29, 1918 |
| 1,364,927 | Fulton | Jan. 11, 1921 |
| 1,792,785 | Upton | Feb. 17, 1931 |
| 1,983,543 | Ilsley | Dec. 11, 1934 |
| 2,101,369 | Jorgensen | Dec. 7, 1937 |
| 2,268,083 | Repuano | Dec. 30, 1941 |
| 2,291,607 | Chausson | Aug. 4, 1942 |
| 1,649,246 | Morrisey | Nov. 15, 1927 |
| 1,936,325 | Carson | Nov. 21, 1933 |
| 2,314,937 | Hannon | Mar. 30, 1943 |
| 1,803,952 | Upton | May 5, 1931 |
| 2,348,212 | Gill | May 9, 1944 |